United States Patent [19]

Callaghan et al.

[11] Patent Number: 4,874,535
[45] Date of Patent: Oct. 17, 1989

[54] SCALE INHIBITORS

[75] Inventors: Ian C. Callaghan, Wokingham; Ian Livsey, Twickenham, both of England

[73] Assignee: The Britisch Petroleum Company p.l.c., London, England

[21] Appl. No.: 188,689

[22] Filed: Apr. 28, 1988

Related U.S. Application Data

[63] Continuation of Ser. No. 839,144, Mar. 12, 1986, abandoned.

[30] Foreign Application Priority Data

Mar. 14, 1985 [GB] United Kingdom ............... 8506616

[51] Int. Cl.$^4$ ..................... E21B 43/28; C02F 5/14
[52] U.S. Cl. ................... 252/8.552; 252/180; 210/699
[58] Field of Search ................ 252/8.552, 180; 210/699

[56] References Cited

U.S. PATENT DOCUMENTS

| | | | |
|---|---|---|---|
| 2,723,956 | 11/1955 | Johnson | 252/180 X |
| 3,214,454 | 10/1965 | Blaser et al. | 252/180 X |
| 3,483,925 | 12/1969 | Slyker | 252/8.552 |
| 3,532,167 | 10/1970 | Noe et al. | 166/275 |
| 3,600,524 | 7/1986 | Cuisia et al. | 252/180 X |
| 3,663,448 | 5/1972 | Ralston | 252/8.552 X |
| 3,715,307 | 2/1973 | Johnson et al. | 252/180 X |
| 3,965,003 | 6/1976 | Stanford et al. | 252/8.552 X |
| 4,008,164 | 2/1977 | Watson et al. | 252/8.552 |
| 4,306,991 | 12/1981 | Hwa et al. | 252/180 |
| 4,563,284 | 1/1986 | Amjad | 252/8.552 X |

FOREIGN PATENT DOCUMENTS 0123108  10/1984  European Pat. Off. .

Primary Examiner—John F. Terapane
Assistant Examiner—Gary Geist
Attorney, Agent, or Firm—Morgan & Finnegan

[57] ABSTRACT

A scale inhibiting composition comprises the combination of (a) a copolymer of an alkene, preferably a branched chain alkene, and an unsaturated dicarboxylic acid or anhydride, in acidic or neutralized form, and (b) an organic polyphosphonic acid or salt.

A preferred composition contains the sodium salt of a copolymer of isobutene and maleic anhydride and 1-hydroxyethyl-1,1-diphosphonic acid.

The compositions may be used in secondary or tertiary oil recovery, desalination of sea water and the softening of boiler feed water.

7 Claims, No Drawings

SCALE INHIBITORS

This is a continuation of co-pending application Ser. No. 839,144 filed on Mar. 12, 1986, now abandoned.

This invention relates to compositions containing a copolymer of an alkene and an unsaturated dicarboxylic acid or anhydride, in acidic or neutralised form, and an organic polyphosphonic acid or salt and to the use of such compositions in inhibiting the formation of scale.

A scale inhibitor is a compound or mixture which inhibits crystal growth and thereby reduces the tendency of scale to form.

Scale inhibitors are used in many water treatment processes where there is a risk of inorganic deposits, i.e., scale, forming as a result of the presence of certain di- or higher valent metal ions, particularly alkaline earth metal ions.

Certain scale inhibitors have the ability to act as a threshold agents, that is to say, they are effective at concentrations below those which would be required theoretically to complex completely with multivalent ions present.

Scale inhibitors are used in the oil industry. Water flooding is one of the most successful and extensively used secondary recovery methods. Water is injected under pressure into the reservoir via injection wells and drives the oil through the rock into nearby producing wells. In this type of operation it is most important to ensure that the injection water is free from suspended particles or any chemical or biological substance which might cause blockage of the pore channels in the reservoir rock. The oil in the reservoir is frequently associated with connate water which contains various metal ions, sometimes including barium and strontium. Many oil fields are situated in offshore locations and for them the only source of injection water is the sea. Sea water contains sulphate and carbonate ions which, in the absence of treatment, would react with alkaline earth metal ions in the connate water to precipitate scale. In order to prevent this, scale inhibitors are used. Typical scale inhibitors include sulphonated ethoxylated hydrocarbons, polyacrylates, amine phosphonates and organic polyphosphonic acids.

Another area in which such compounds are employed is in the field of water treatment. Particular aspects include the desalination of sea water and the softening of boiler feed water.

We have now discovered that mixtures of copolymers of alkenes and unsaturated dicarboxylic acids or anhydrides, in acidic or neutralised form, and organic polyphosphonic acids or salts are particularly effective scale inhibitors.

Thus according to the present invention there is provided a scale inhibiting composition comprising the combination of (a) a copolymer of an alkene, preferably a branched chain alkene, and an unsaturated dicarboxylic acid or anhydride, in acidic or neutralised form, of formula:

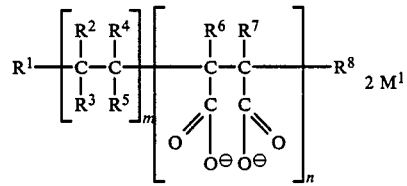

wherein $R^1$–$R^8$ are hydrogen atoms or alkyl groups containing 1 to 22 carbon atoms; $M^1$ is an alkali metal, ammonium or hydrogen ion; and m and n are numbers in the range 3 to 3,000, preferably 10 to 1,000; and (b) an organic polyphosphonic acid or salt of formula:

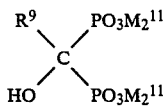

wherein $R^9$ is an alkyl group containing 1 to 12 carbon atoms, and $M^{11}$ is an alkali metal, ammonium or hydrogen ion or an ion derived from an amine or alkanolamine.

Components (a) and (b) are suitably present in a weight ratio in the range 10:1 to 1:10, preferably 30:70.

In respect of Component (a) the preferred alkene is isobutene, the preferred unsaturated dicarboxylic acid or anhydride is maleic anhydride, and the preferred cation is sodium.

Preferably m and n are equal numbers.

The salts or acids are white, crystalline solids which are soluble in aqueous media and possess good alkaline earth metal complexing characteristics which are enhanced by the presence of Component (b).

Component (b) is preferably used in the form of the free acid or an alkali metal salt. Preferred compounds are 1-hydroxyethyl-1, 1-diphosphonic acid and its sodium salt.

These are also white, crystalline solids which are soluble in aqueous media.

According to another aspect of the present invention there is provided a method for inhibiting scale formation which method comprises adding an aqueous solution of a composition comprising the combination of (a) a copolymer of an alkene, preferably a branched chain alkene, and an unsaturated dicarboxylic acid or anhydride, in acidic or neutralised form, of formula

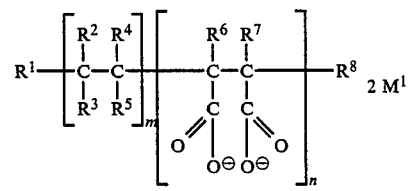

wherein $R^1$–$R^8$ are hydrogen atoms or alkyl groups containing 1 to 22 carbon atoms; $M^1$ is an alkali metal, ammonium or hydrogen ion; and m and n are numbers in the range 3 to 3,000, preferably 10 to 1,000; and (b) an organic polyphosphonic acid or salt of formula:

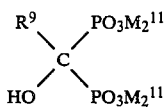

wherein $R^9$ is an alkyl group containing 1 to 12 carbon atoms, and $M^{11}$ is an alkali metal, ammonium or hydrogen ion or an ion derived from an amine or alkanolamine to an aqueous medium containing potential scale forming constituents.

The composition is suitable employed in a concentration in the range 1 to 100 ppm.

The composition may be used in formulations for use in secondary or tertiary oil recovery or in compositions for use in the desalination of sea water or the softening of boiler feed water.

Thus according to another aspect of the present invention there is provided a method for the recovery of crude oil from a production reservoir which method comprises the steps of injecting into the reservoir through an injection well an aqueous medium having dissolved therein a scale inhibiting composition comprising the combination of (a) a copolymer of an alkene, preferably a branched chain alkene, and an unsaturated dicarboxylic acid or anhydride, in acidic or neutralised form, of formula:

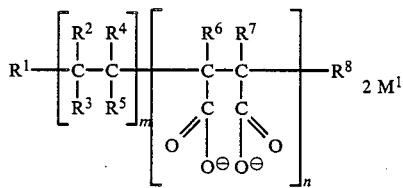

wherein $R^1$-$R^8$ are hydrogen atoms or alkyl groups containing 1 to 22 carbon atoms; $M^1$ is an alkali metal, ammonium or hydrogen ion; and m and n are numbers in the range 3 to 3,000, preferably 10 to 1,000; and (b) an organic polyphosphonic acid or salt of formula:

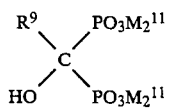

wherein $R^9$ is an alkyl group containing 1 to 12 carbon atoms, and $M^{11}$ is an alkali metal, ammonium or hydrogen ion or an ion derived from an amine or alkanolamine, and recovering crude oil from a production well.

The invention is illustrated with reference to the following Examples of which Examples 1 and 2 are provided for comparison.

EXAMPLES 1—3

The technique used to evaluate the potential scale inhibiting efficiency of the compounds studied was as follows.

Supersaturated, metastable BaSO$_4$ solutions ($10^{-4}$ mol dm$^{-3}$) were prepared by mixing solutions of Na$_2$SO$_4$ and BaCl$_2$ in a small beaker. An electrode was inserted into the solution and the conductance of the solution was monitored using a Wayne Kerr bridge instrument. The potential inhibitor was added to the solution at a known concentration. This often resulted in an initial, temporary increase in the conductance of the solution, reflecting the ionic character of the additive. 0.1 g of BaSO$_4$ seed crystals was accurately weighed out and added to the solution which was stirred to ensure that the seed crystals were dispersed throughout the whole volume of the sample.

The subsequent decrease in conductance was monitored as a function of time using a chart recorder. From the resulting trace, values of conductance were taken at specified time intervals and, where an inhibitor was present, compared with the values when no inhibitor had been present (ie, the blank sample). This was normally done for the conductance values at 20 min; the reason for this being that where the blank was concerned, after 20 min the conductance had almost reached its equilibrium value. Hence, it was concluded that the efficiency of an inhibitor would be reflected in the smaller decrease in conductance after 20 min over the decrease for the blank sample at the same time, i.e.

$$\frac{\Delta T\%}{\Delta T} = \frac{C_{1,I} - C_{20,I}}{C_{1,B} - C_{20,B}} \times 100$$

where:

$\Delta T/\Delta T_o$ = the percentage of scale formed, relative to that formed in the blank sample, when a particular inhibitor was present.

$C_{1,I}$ = the conductance at 1 min for the inhibitor containing sample.

$C_{20,I}$ = the conductance at 20 min for the inhibitor containing sample.

$C_{I,B}$ = the conductance at 1 min for the blank sample.

$C_{20,B}$ = the conductance at 20 min for the blank sample.

The value of $C_{1,I}$ (and consequently $C_{1,B}$) was chosen because it was often observed that upon addition of the seed crystals there was a marked increase in conductance which decayed away in about 1 min. Hence it was only after 1 min that a meaningful comparison could be made.

The results set out in the following Table 1 were obtained.

TABLE 1

| Example | Compound | Concentration ppm | % Scale Formation |
|---|---|---|---|
| 1 | HEDP | 10 | 55.4 |
| 2 | IBMA | 10 | 67.8 |
| 3 | 1:1 IBMA:HEDP | 10 | 23.0 |

HEDP = Sodium salt of 1-Hydroxyethyl-1,1-diphosphonic acid
IBMA = Isobutene-maleic anhydride copolymer of Mw = 5.5–6.5 × 10$^4$ in the form of its sodium salt.

EXAMPLES 4–7

The mixed inhibitor composition of Example 3 was further tested in static precipitation tests against barium and strontium under differing formation water/sea water ratios and concentrations by the method described by C. T. Hughes and K. P. Whittingham, Europec 1982, Conference Proceedings.

The results set out in the following Table 2 were obtained.

TABLE 2

| Example | Concentration ppm | Ratio FW:SW | % Scale Formation Barium | % Scale Formation Strontium |
| --- | --- | --- | --- | --- |
| 4 | 10 | 90:10 | 12 | 52 |
| 5 | 50 | 90:10 | 14 | 58 |
| 6 | 10 | 50:50 | 21 | 30 |
| 7 | 50 | 50:50 | 15 | 28 |

FW = Formation Water
SW = Sea Water

EXAMPLES 8–13

The procedure of Example 3 was repeated with the difference that the weight ratio of the two components of the mixed inhibitor was varied.

The results set out in the following Table 3 were obtained.

TABLE 3

| Example | Wt ratio of IBMA to HEDP | % Scale Formation |
| --- | --- | --- |
| 8 | 10:90 | 23 |
| 9 | 20:80 | 21 |
| 10 | 30:70 | 15 |
| 11 | 40:60 | 16 |
| 12 | 50:50 | 27 |
| 13 | 60:40 | 32 |

We claim:

1. A scale inhibiting composition comprising the combination of
   (a) a copolymer of isobutene and maleic acid or anhydride wherein the copolymer has 3–3000 units derived from isobutene and 3–3000 units derived from maleic acid or anhydride, said copolymer being in its acid or alkali metal or ammonium form,
   (b) a 1-hydroxyethyl 1,1diphosphonic acid or salt form selected from the group consisting of alkali metal, ammonium, amine and alkanolamine salt form; said components (a) and (b) being present in a weight ratio in the range of 10:1 to 1:10.
2. A composition according to claim 1 wherein (b) is a sodium salt form.
3. A composition according to claim 1 wherein the isobutene units and maleic acid or anhydride units are in the ranges of 10 to 1,000.
4. A composition according to claim 1 wherein (b) is 1-hydroxyethyl-1,1-diphosphonic acid.
5. A method for inhibiting scale formation which method comprises adding solution of the composition of claim 1 to an aqueous medium containing potential scale forming constituents.
6. A method according to claim 5 wherein the composition is employed in a concentration in the range 1 to 100 ppm.
7. A method for the recovery of crude oil from a production reservoir which method comprises the steps of injecting into the reservoir through an injection well an aqueous medium having dissolved therein the scale inhibiting composition of claim 1 and recovering crude oil from a production well.

* * * * *